United States Patent
Chao et al.

(10) Patent No.: US 8,797,013 B2
(45) Date of Patent: Aug. 5, 2014

(54) ADAPTIVE SLOPE-COMPENSATION MODULE AND METHOD THEREOF

(75) Inventors: Hsing-Kuo Chao, Hsin-Chu (TW); Yi-Shan Chu, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 647 days.

(21) Appl. No.: 13/078,005

(22) Filed: Apr. 1, 2011

(65) Prior Publication Data

US 2012/0074917 A1    Mar. 29, 2012

(30) Foreign Application Priority Data

Apr. 2, 2010    (TW) .............................. 99110327 A (51) Int. Cl.
*G05F 1/40*    (2006.01)
*G05F 1/10*    (2006.01)

(52) U.S. Cl.
USPC .......................................... 323/285; 323/222

(58) Field of Classification Search
CPC ..................................................... H02M 3/155
USPC .................. 323/222, 223, 265, 266, 282, 285
See application file for complete search history.

(56) References Cited

U.S. PATENT DOCUMENTS

| | | | | |
|---|---|---|---|---|
| 6,611,131 B2 * | 8/2003 | Edwards | ........................ | 323/282 |
| 7,425,819 B2 * | 9/2008 | Isobe | ............................. | 323/222 |
| 7,605,574 B2 * | 10/2009 | Dearn et al. | .................. | 323/284 |
| 7,656,142 B2 * | 2/2010 | Liao | .............................. | 323/288 |
| 7,936,157 B2 * | 5/2011 | Kashima | ....................... | 323/282 |
| 2010/0308783 A1 * | 12/2010 | Farley | ........................... | 323/282 |

\* cited by examiner

*Primary Examiner* — Matthew Nguyen
(74) *Attorney, Agent, or Firm* — Winston Hsu; Scott Margo (57) ABSTRACT

An adaptive slope-compensation method is applied for a switch-mode power supply. The switch-mode power supply has a power switch, and an inductor coupled to an input power. The power switch controls the inductor storing energy or releasing energy to generate an output voltage. The adaptive slope-compensation method includes detecting an inductor current passing through the inductor and to generate an inductor-current detecting voltage, detecting a duty cycle of the power switch, detecting a voltage variation of the inductor-current detecting voltage when the power switch is turned on, generating a slope-compensation signal according to the voltage variation and the duty cycle, and adjusting the timing of turning the power switch on or off. In this way, even if the operation conditions of the input power and the output voltage change, the system still can quickly response and does not generate sub-harmonic oscillation.

17 Claims, 9 Drawing Sheets

ADAPTIVE SLOPE-COMPENSATION MODULE AND METHOD THEREOF

BACKGROUND OF THE INVENTION

1. Field of the Invention

The present invention is related to an adaptive slope-compensation module, and more particularly, to an adaptive slope-compensation module applied for a switch-mode power supply.

2. Description of the Prior Art

In general, when the duty cycle of the power switch in a switch-mode power supply is over 0.5, sub-harmonic oscillation may be induced. That is, the switch-mode power supply may oscillate with a half of the switching frequency. This problem is often solved by a slope-compensation mechanism. However, in general slope-compensation methods, when the operational condition of the input power or the output voltage of the switch-mode power supply changes, the amount of slope-compensation is easily too much or not enough, causing the sub-harmonic oscillation to still be generated or the system response becomes slow.

SUMMARY OF THE INVENTION

The present invention provides an adaptive slope-compensation method applied to a switch-mode power supply. The switch-mode power supply has a power switch and an inductor coupled to an input power. The power switch controls the inductor to store energy or release energy to generate an output voltage. The adaptive slope-compensation method comprises detecting an inductor current passing through the inductor, thereby generating an inductor-current detecting voltage, detecting a duty cycle of the power switch, detecting a voltage variation of the inductor-current detecting voltage when the power switch is turned-on, generating a slope-compensation signal according to the voltage variation and the duty cycle, and adjusting a timing to turn on or turn off the power switch according to the slope-compensation signal.

The present invention further provides an adaptive slope-compensation module applied to a switch-mode power supply. The switch-mode power supply has a switch control circuit, a power switch, an inductor coupled to an input power, and an inductor-current detecting circuit for detecting an inductor current passing through the inductor, thereby generating an inductor-current detecting voltage. The switch control circuit controls the power switch to turn on or off to control the inductor to store energy or release energy to generate an output voltage. The adaptive slope-compensation module comprises a duty-cycle detecting circuit, a voltage-variation detecting circuit, and a slope-compensation integrating circuit. The duty-cycle detecting circuit is utilized for detecting a duty cycle of the power switch. The voltage-variation detecting circuit is utilized for detecting a voltage variation of the inductor-current detecting voltage when the power switch is turned on. The slope-compensation integrating circuit is utilized for calculating a compensation slope according to the voltage variation and the duty cycle, then integrating the compensation slope to generate a slope-compensation signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
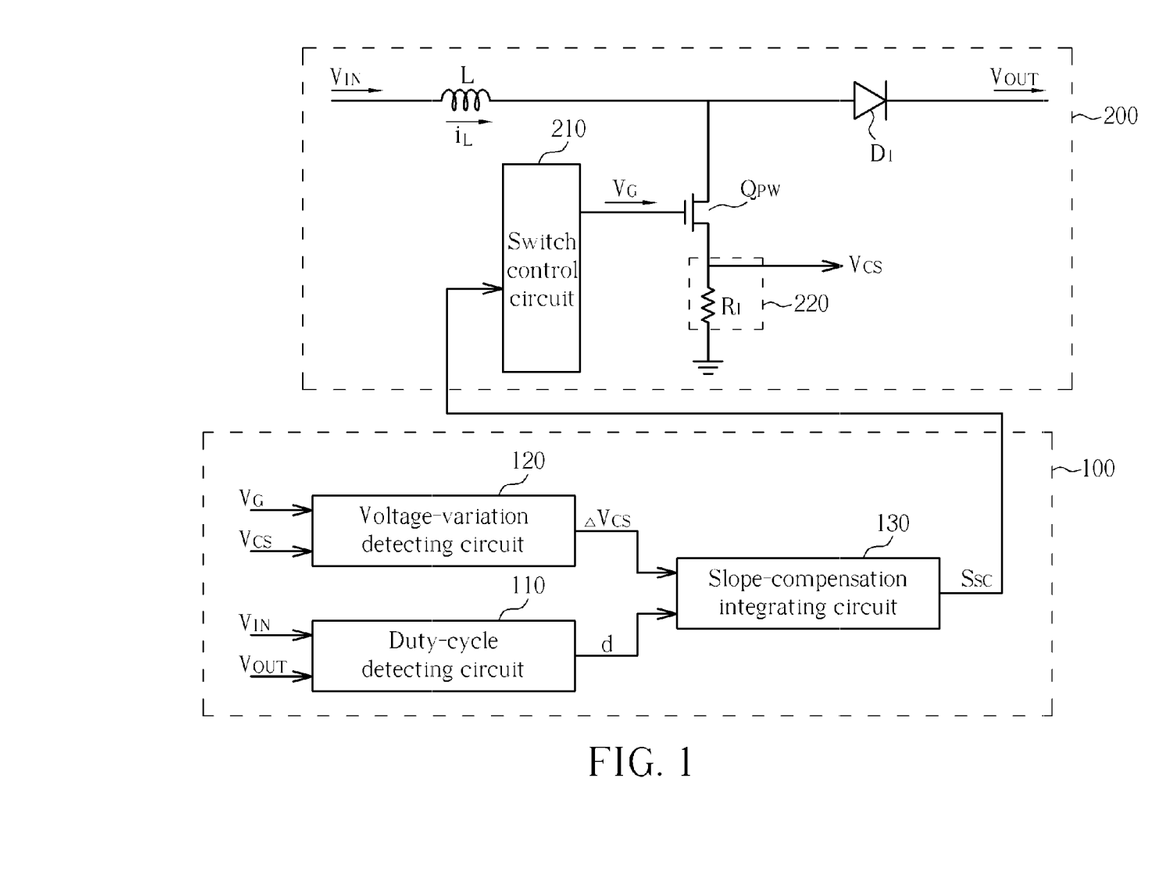
FIG. 1 is a diagram illustrating an adaptive slope-compensation module according to an embodiment of the present invention.

Please refer to FIG. 1. FIG. 1 is a diagram illustrating an adaptive slope-compensation module 100 according to an embodiment of the present invention. The adaptive slope-compensation module 100 is applied to switch-mode power supply 200. The switch-mode power supply 200 operates in the continuous current mode (CCM). The adaptive slope-compensation module 100 according to the embodiment of the present invention can be applied to a buck power supply, a boost power supply, and a buck-boost power supply. For convenience sake, it is assumed that the switch-mode power supply 200 is a boost power supply in the following description.

The switch-mode power supply 200 has a switch control circuit 210, a power switch $Q_{PW}$, a diode $D_1$, an inductor L, and an inductor-current detecting circuit 220. The inductor L is coupled to the input power $V_{IN}$. The switch control circuit 210 controls the power switch $Q_{PW}$ to turn on or off to cause the inductor L to store or release energy to generate the output voltage $V_{OUT}$. The inductor-current detecting circuit 220 detects the current passing through the inductor L to generate an inductor-current detecting voltage $V_{CS}$. The adaptive slope-compensation module 100 includes a duty-cycle detecting circuit 110, a voltage-variation detecting circuit 120, and a slope-compensation integrating circuit 130. The duty-cycle detecting circuit 110 is utilized for detecting the duty cycle d of the power switch $Q_{PW}$. The voltage-variation detecting circuit 120 is utilized for detecting a voltage variation $\Delta V_{CS}$ of the inductor-current detecting voltage $V_{CS}$ when the power switch $Q_{PW}$ is turned on. The slope-compensation integrating circuit 130 is utilized for calculating a compensation slope $M_A$ according to the duty cycle d and the voltage variation $\Delta V_{CS}$, and integrating the compensation slope $M_A$ to generate a slope-compensation signal $S_{SC}$. The switch control circuit 210 adjusts the timing of turning the power switch $Q_{PW}$ on or off according to the slope-compensation signal $S_{SC}$. In this way, even if the operational conditions of the input power $V_{IN}$ and the output voltage $V_{OUT}$ change, the switch-mode power supply 200 still can quickly respond and does not generate sub-harmonic oscillations. The operational principle is further illustrated in the following description.

Figure 2:
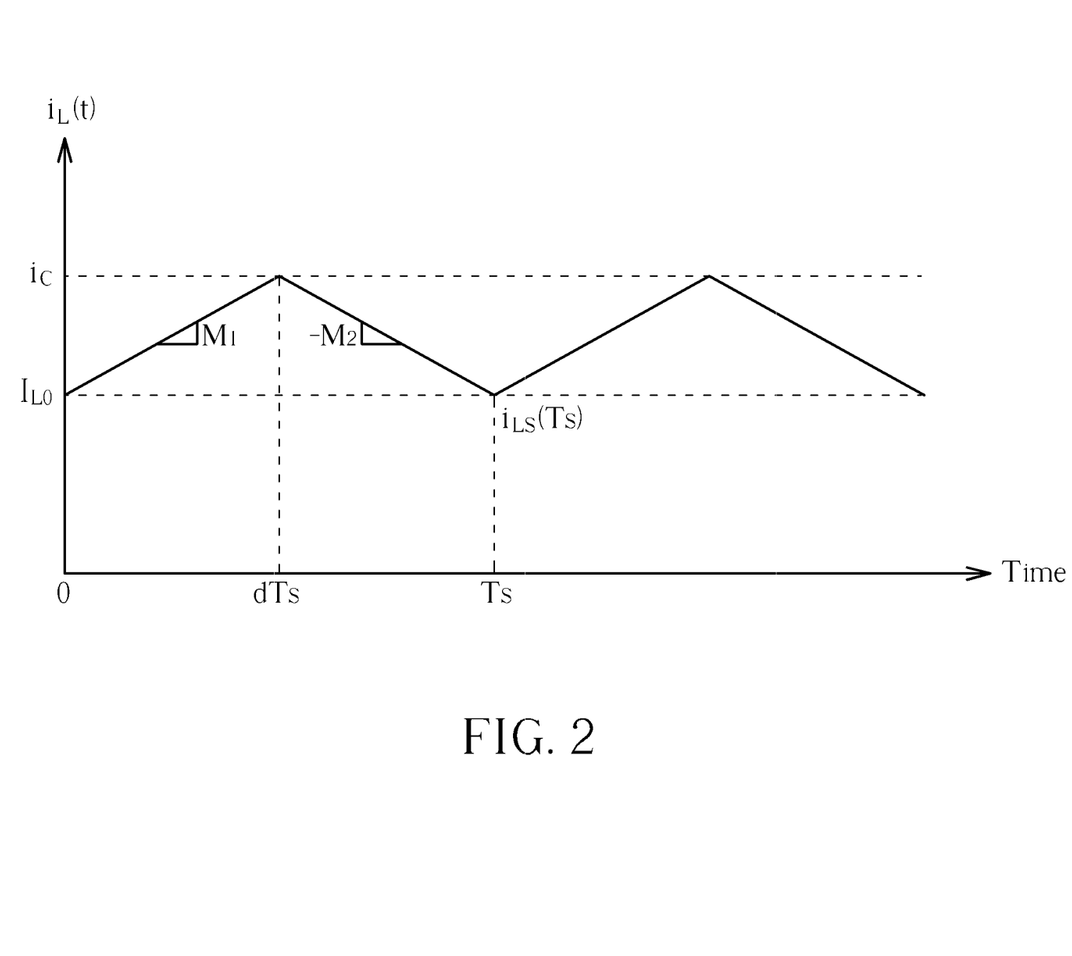
FIG. 2 is a waveform diagram of the inductor current passing through the switch-mode power supply in the ideal situation.
Figure 3:
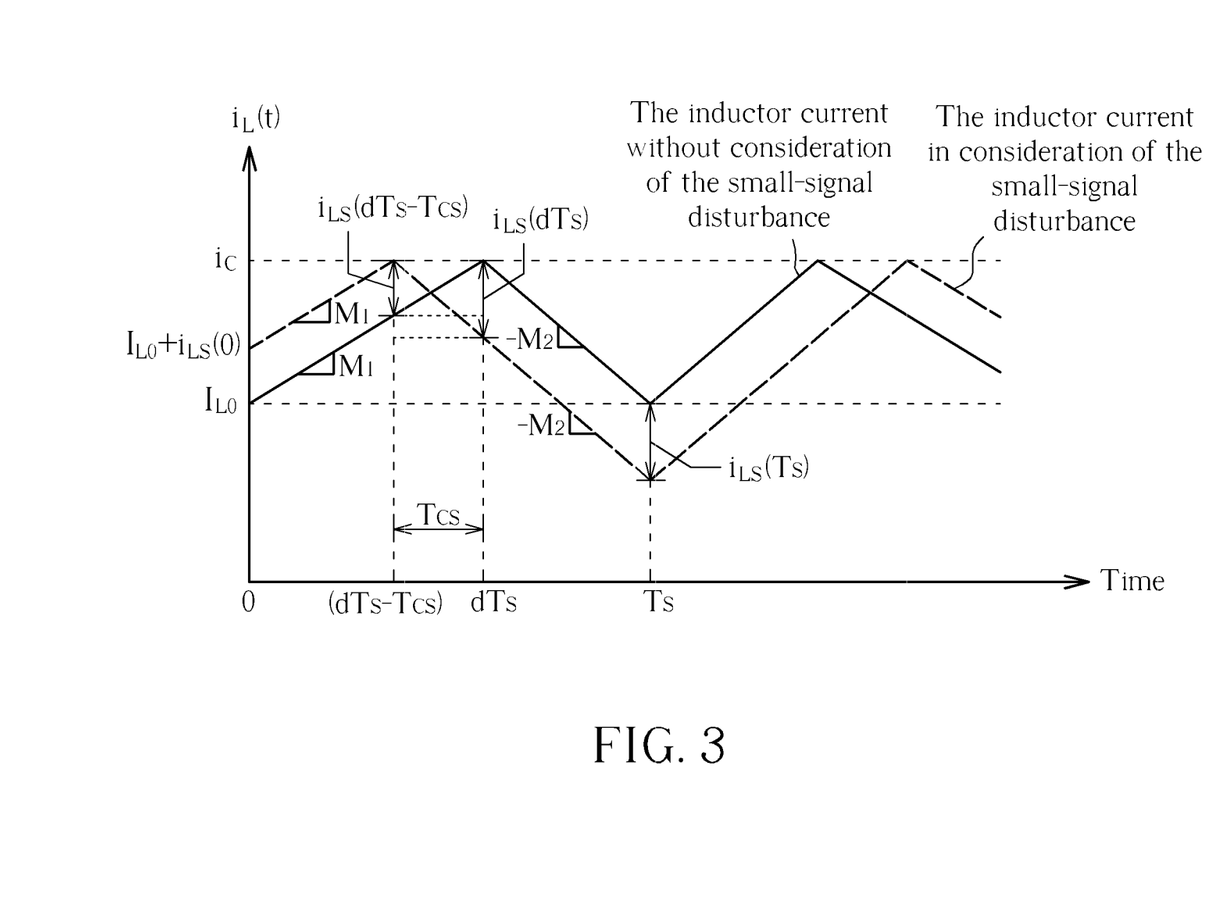
FIG. 3 is a waveform diagram of the inductor current in consideration of the influence of a small-signal disturbance.
Figure 4:
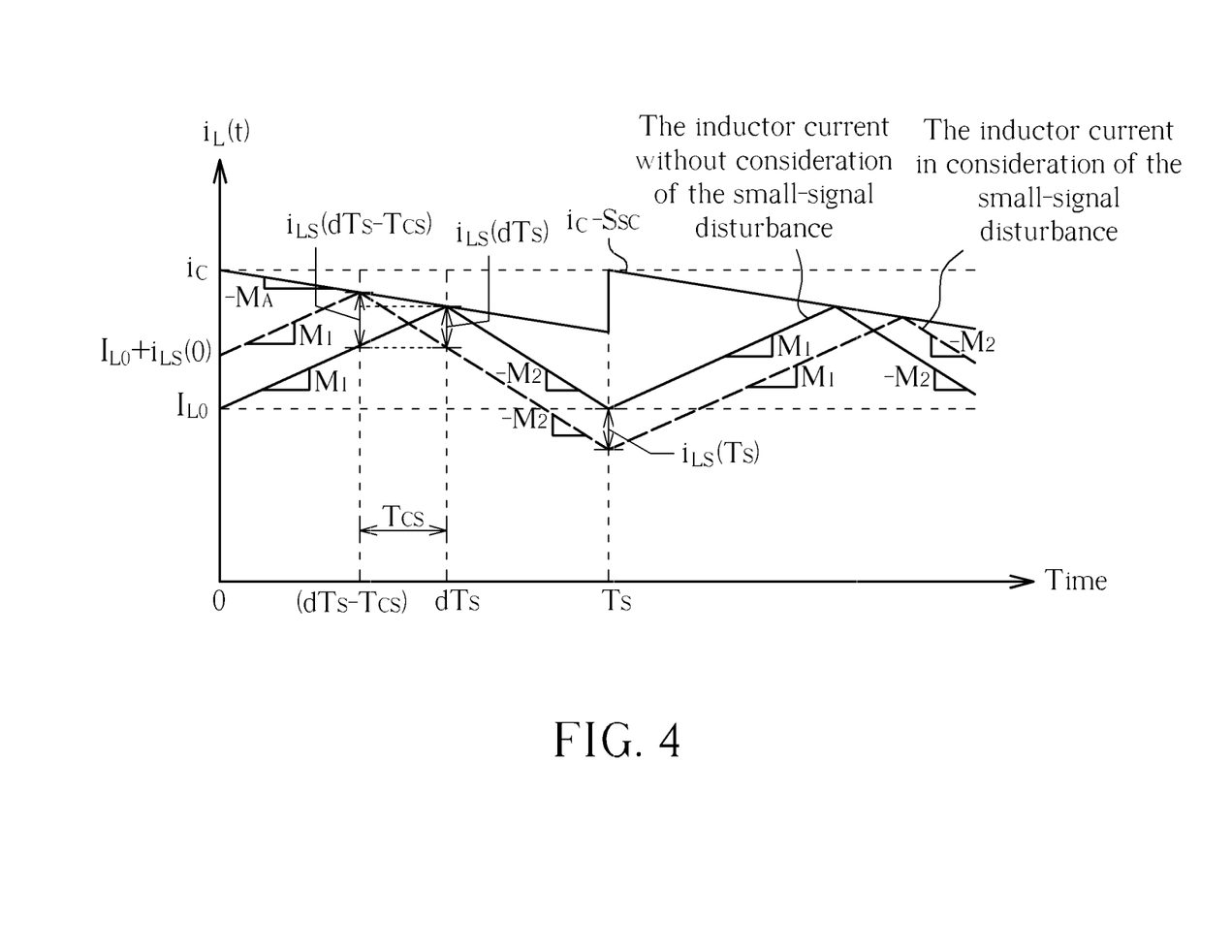
FIG. 4 is a waveform diagram of the inductor current of the switch-mode power supply after slope-compensation by the adaptive slope-compensation module.

Please refer to FIG. 2, FIG. 3, and FIG. 4, which are diagrams illustrating the operational principle of adjusting the timing of turning the power switch $Q_{PW}$ on or off according to the slope-compensation signal $S_{SC}$ generated by the adaptive slope-compensation module 100 to avoid sub-harmonic oscillations occurring in the switch-mode power supply. FIG. 2 is a diagram of the inductor current $i_L$ passing through the switch-mode power supply 200 in the ideal situation. In FIG. 2, $i_L(t)$ represents the waveform of the inductor current; $I_{L0}$ represents the initial value of the inductor current; $i_C$ represents the inductor-current peak-value control signal; d represents the duty cycle of the power switch $Q_{PW}$; $T_S$ represents the pulse-width-modulation (PWM) cycle of the power switch $Q_{PW}$ (that is, an interval between a timing of turning on the power switch $Q_{PW}$ and the next timing of turning on the power switch $Q_{PW}$ again); $M_1$ represents the inductor-current slope of the positive half cycle slope; and $M_2$ represents the inductor-current slope of the negative half cycle. The relation among $M_1$, $M_2$, the inductor L, the input power $V_{IN}$, and the output voltage $V_{OUT}$ of the switch-mode power supply 200 varies with the type of the switch-mode power supply 200, which is shown in Table 1:

TABLE 1

| Buck power supply | Boost power supply | Buck-boost power supply |
|---|---|---|
| $M_1 = (V_{IN} - V_{OUT})/L$ | $M_1 = V_{IN}/L$ | $M_1 = V_{IN}/L$ |
| $M_2 = V_{OUT}/L$ | $M_2 = (V_{OUT} - V_{IN})/L$ | $M_2 = -V_{OUT}/L$ |

For convenience sake, in the present invention, the switch-mode power supply 200 is illustrated to be a boost power supply only as an example. In FIG. 2, the switch-mode power supply 200 operates in the CCM mode. When the switch-mode power supply 200 is in the steady state, the inductor-current initial value $I_{L0}$ equals the inductor current $i_L(T_S)$ of the next time the power switch $Q_{PW}$ is turned on again. In other words, the variation of the inductor current $i_L$ from the time 0 to $T_S$ equals zero. Therefore, the relation among the inductor-current slope $M_1$ of the positive half cycle, the inductor-current slope $M_2$ of the negative half cycle, and the duty cycle d of the power switch $Q_{PW}$ is represented as the following formula:

$$M_1 \cdot dT_S - M_2 \cdot (1-d)T_S = 0 \rightarrow M_2/M_1 = d/(1-d) \quad (1).$$

In consideration that in practical usage the inductor current $i_L$ is affected by a small-signal disturbance $i_{LS}$, the inductor current $i_L$ shown in FIG. 2 changes to be the inductor current shown in FIG. 3. It can be seen in FIG. 3 that since the inductor current $i_L$ is affected by the small-signal disturbance $i_{LS}$, the inductor current $i_L$ rises up to the peak value in advance at the time $(dT_S - T_{CS})$ so that the switch control circuit 210 turns off the power switch $Q_{PW}$ at the time $(dT_S - T_{CS})$, wherein $T_{CS}$ represents the time difference because of the small-signal disturbance ins. Because the rising slope of the inductor current $i_L$ when the power switch is turned on still equals $M_1$, the small-signal disturbance $i_{LS}(dT_S - T_{CS})$ at the time $(dT_S - T_{CS})$ equals the small-signal disturbance $i_{LS}(0)$ at the time 0. It can be seen in FIG. 3 that the value of the small-signal disturbance $i_{LS}(dT_S - T_{CS})$ at the time $(dT_S - T_{CS})$ is $(M_1 \times T_{CS})$. In other words, the small-signal disturbance $i_{LS}(0)$ at the time 0 is represented as the following formula:

$$i_{LS}(0) = M_1 \times T_{CS} \quad (2).$$

Similarly, in consideration of the situation that the inductor current $i_L$ is affected by the small-signal disturbance $i_{LS}$, since the falling slope of the inductor current $i_L$ when the power switch is turned off still equals $M_2$, the small-signal disturbance $i_{LS}(dT_S)$ at the time $(dT_S)$ equals the small-signal disturbance $i_{LS}(T_S)$ at the time $T_S$. It can be seen in FIG. 3 that the value of the small-signal disturbance $i_{LS}(dT_S)$ at the time $(dT_S)$ is $(M_2 \times T_{CS})$. In other words, the small-signal disturbance $i_{LS}(T_S)$ at the time $T_S$ is represented as the following formula:

$$i_{LS}(T_S) = M_2 \times T_{CS} = i_{LS}(0) \times (M_2/M_1) \quad (3).$$

In this way, according to the formulas (1) and (3) the small-signal disturbance $i_{LS}(NT_S)$ at the time $(N \times T_S)$ is represented as the following formula:

$$i_{LS}(NT_S) = i_{LS}(0) \times [d/(1-d)]^N \quad (4).$$

Consequently, according to the formula (4), it can be known that the small-signal disturbance $i_{LS}(NT_S)$ converges only if the modulus of $[d/(1-d)]$ is less than 1. That is, the duty cycle d of the power switch $Q_{PW}$ has to be less than 0.5 for the switch-mode power supply 200 to not generate the sub-harmonic oscillation. Please refer to FIG. 4. FIG. 4 is a waveform diagram of the inductor current $i_L$ of the switch-mode power supply 200 after slope-compensation by the adaptive slope-compensation module 100. In FIG. 4, equivalently speaking, the inductor-current peak-value control signal $i_C$ is compensated by a negative slope $M_A$ by means of the slope-compensation mechanism. Similar to the above-mentioned analysis, the small-signal disturbance $i_{LS}(0)$ at the time 0 is represented as the following formula:

$$i_{LS}(0) = (M_1 + M_A) \times T_{CS} \quad (5).$$

The falling slope of the inductor current $i_L$ when the power switch $Q_{PW}$ is turned off still equals $M_2$. Thus, similar to the above-mentioned analysis, the small-signal disturbance $i_{LS}(T_S)$ at the time $T_S$ is represented as the following formula:

$$i_{LS}(T_S) = (M_2 - M_A) \times T_{CS} \quad (6).$$

In this way, according to the formulas (5) and (6), the small-signal disturbance $i_{LS}(NT_S)$ at the time $(N \times T_S)$ is represented by the following formula after the slope-compensation by the adaptive slope-compensation module 100:

$$i_{LS}(NT_S) = i_{LS}(0) \times \{(1 - M_A/M_2)/[(1-d) + M_A/M_2]\}^N \quad (7).$$

As a result, it can be known according to the formula (7) that as long as the compensation slope $M_A$ generated by the slope-compensation integrating circuit 130 of the adaptive slope-compensation module 100 is set to be within the range $\frac{1}{2} \times M_2 \leq M_A \leq M_2$ (for example, set the compensation slope $M_A$ to be $\frac{2}{3} \times M_2$), the sub-harmonic oscillation is avoided even if the duty cycle d of the power switch $Q_{PW}$ of the switch-mode power supply 200 is over 0.5.

In conclusion, the compensation slope $M_A$ of the adaptive slope-compensation module 100 is determined by the inductor-current slope $M_2$ ($M_1$) of the negative (positive) half cycle according to the embodiment of the present invention. In addition, it can be seen in Table 1 that $M_1$ and $M_2$ can be expressed by a function of the input power $V_{IN}$, output voltage $V_{OUT}$, and the inductor L. In other words, when the inductance of the inductor L is known, as long as the adaptive slope-compensation module 100 of the present invention detects the variation of the input power $V_{IN}$ or the output voltage $V_{OUT}$, or the signal capable of representing the variation of the input power $V_{IN}$ or the output voltage $V_{OUT}$, the compensation slope $M_A$ can be calculated. In this way, the adaptive slope-compensation module 100 of the present invention can generate a proper amount of the slope-compensation (slope-compensation signal $S_C$) according to the above-mentioned slope-compensation $M_A$. Consequently, even if the operation condition of the input power $V_{IN}$ or the output voltage $V_{OUT}$ of the switch-mode power supply 200 changes, the switch control circuit 210 still can properly adjust the timing of turning the power switch $Q_{PW}$ on or off according to the slope-compensation signal $S_{SC}$ generated by the adaptive slope-compensation module 100 of the present invention to maintain the response speed of the switch-mode power supply 200 and avoid the switch-mode power supply 200 generating sub-harmonic oscillation.

Figure 5:
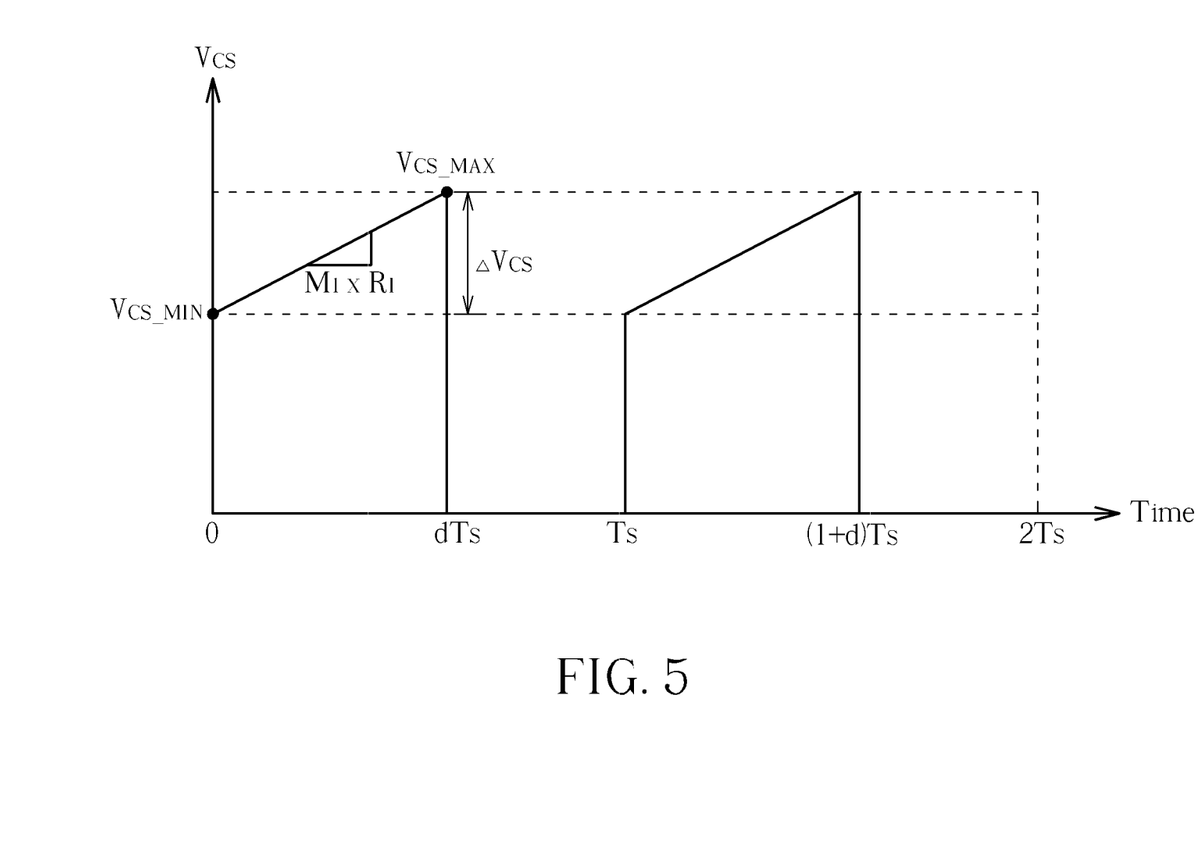
FIG. 5 is a diagram illustrating the operational principle of the slope-compensation integrating circuit of the present invention calculating the compensation slope according to the duty cycle and the voltage variation.

Please refer to FIG. 5. FIG. 5 is a diagram illustrating the operation principle of the slope-compensation integrating circuit 130 of the present invention calculating the compensation slope $M_A$ according to the duty cycle d and the voltage variation $\Delta V_{CS}$. In FIG. 5, $V_{CS}$ represents the inductor-current detecting voltage in proportion to the inductor current $i_L$, wherein the inductor-current detecting voltage $V_{CS}$ is generated by the inductor-current detecting circuit 220 when the power switch $Q_{PW}$ is turned-on. Take FIG. 1 as an example. When the power switch $Q_{PW}$ is turned on, the inductor current $i_L$ passes through the resistor $R_I$ to generate the inductor-current detecting voltage $V_{CS}$. Therefore, the inductor-current detecting voltage $V_{CS}$ equals $(i_L \times R_I)$. The rising slope of the inductor current $i_L$ when the power switch $Q_{PW}$ is turned on is $M_1$. Hence, the rising slope of the inductor-current detecting voltage $V_{CS}$ when the power switch $Q_{PW}$ is turned on is $(M_1 \times R_I)$.

It can be seen in FIG. 5 that the inductor-current slope $M_1$ of the positive half cycle can be calculated by the following formula according to the voltage variation $\Delta V_{CS}$ of the inductor-current detecting voltage $V_{CS}$ when the power switch $Q_{PW}$ is turned-on and the duty cycle d of the power switch $Q_{PW}$:

$$M_1 = \Delta V_{CS}/(d \times T_S \times R_I) \tag{8}$$

In this way, the following formula is further obtained according to the formula (1):

$$M_2 = \Delta V_{CS}/[(1-d) \times T_S \times R_I] \tag{9}$$

As a result, in the present invention, the slope-compensation integrating circuit 130 calculates the inductor-current slope $M_2$ of the negative half cycle according to the duty cycle d, the PWM cycle $T_S$, and the voltage variation $\Delta V_{CS}$, to determine the proper compensation slope $M_A$. In this way, even if the operational condition of the input power $V_{IN}$ or the output voltage $V_{OUT}$ changes, the slope-compensation integrating circuit 130, according to the variation of the duty cycle d and the voltage variation $\Delta V_{CS}$, still can calculate the inductor-current slope $M_2$ of the negative half cycle corresponding to the changed operational condition.

Figure 6:
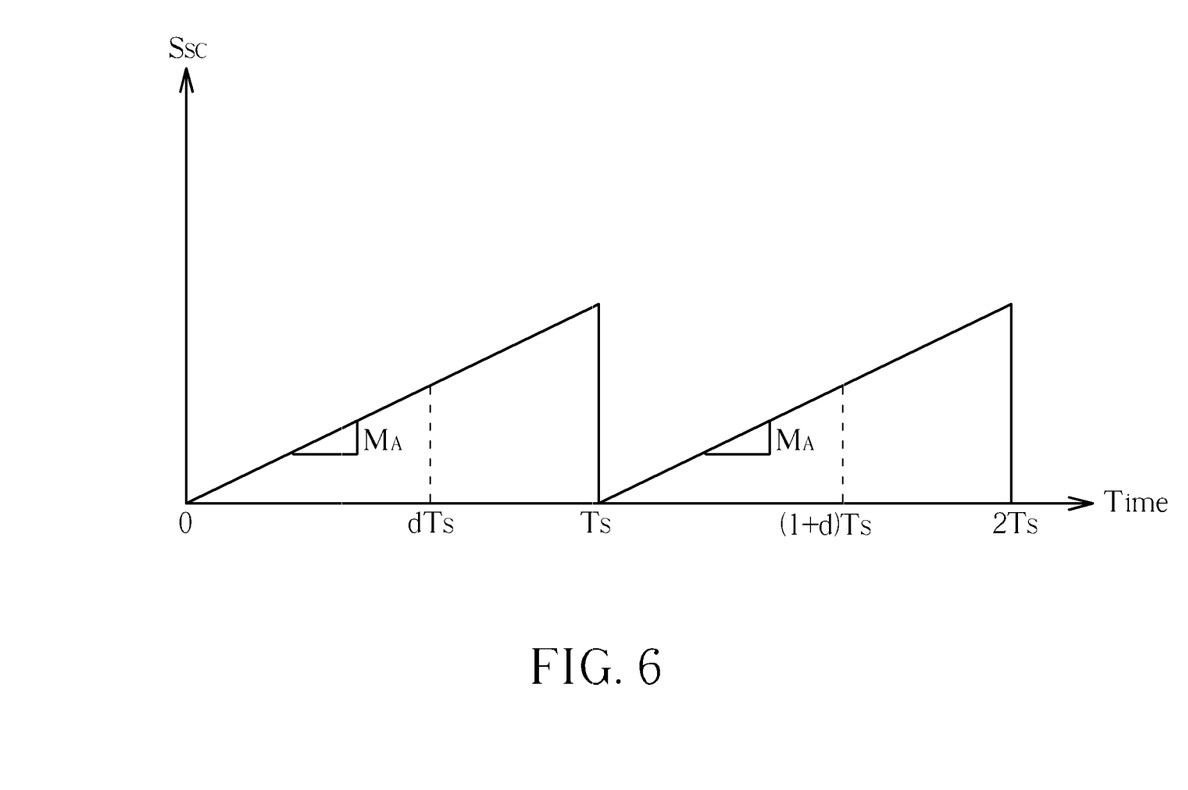
FIG. 6 is a diagram illustrating the slope-compensation signal generated by the slope-compensation integrating circuit according to the compensation slope.

In other words, the slope-compensation circuit 130 properly adjusts the compensation slope $M_A$ according to the change of the operational condition. For instance, the compensation slope $M_A$ is set as $(\frac{2}{3} \times M_2)$ so that $M_A$ can be assured within the range $\frac{1}{2} \times M_2 \leq M_A \leq M_2$. The slope-compensation integrating circuit 130 further integrates the compensation slope $M_A$ to generate the slope-compensation signal $S_{SC}$, as shown in FIG. 6. In this way, the switch control circuit 210 can adjust the timing of turning the power switch $Q_{PW}$ on or off according to the slope-compensation signal $S_{SC}$.

In an embodiment, the switch control circuit 210 determines a limiting value $i_{LIM}$ of the inductor current $i_L$, compensated inductor-current peak-value control signal ($i_C - S_{SC}$)), according to the slope-compensation signal $S_{SC}$, and compares the inductor current $i_L$ with the limiting value $i_{LIM}$. When the inductor current $i_L$ rises up to the limiting value $i_{LIM}$, a comparing signal $S_{CMP}$ is generated for controlling the switch control circuit 210 to turn the power switch $Q_{PW}$ off. In another embodiment, the switch control circuit 210 turns the power switch $Q_{PW}$ off according to the inductor-current detecting voltage $V_{CS}$, a voltage threshold $V_{TH}$, and the slope-compensation signal $S_{SC}$. The inductor-current detecting voltage $V_{CS}$ equals to $(i_L \times R_I)$. The voltage threshold $V_{TH}$ is set as $(i_C \times R_I)$. In addition, for convenience sake, the slope-compensation detecting voltage $V_{CS}$ is obtained by integrating $(M_A \times R_I)$ with respect to time. When the sum of the inductor-current detecting voltage $V_{CS}$ and the slope-compensation signal $S_{SC}$ equals the voltage threshold $V_{TH}$, the switch control circuit 210 turns the power switch $Q_{PW}$ off. No matter which above-mentioned methods is adopted, even if the operational condition of the input power $V_{IN}$ or the output voltage $V_{OUT}$ changes, the switch-mode supply 200 still can maintain fast response and avoid the sub-harmonic oscillations.

Figure 7:
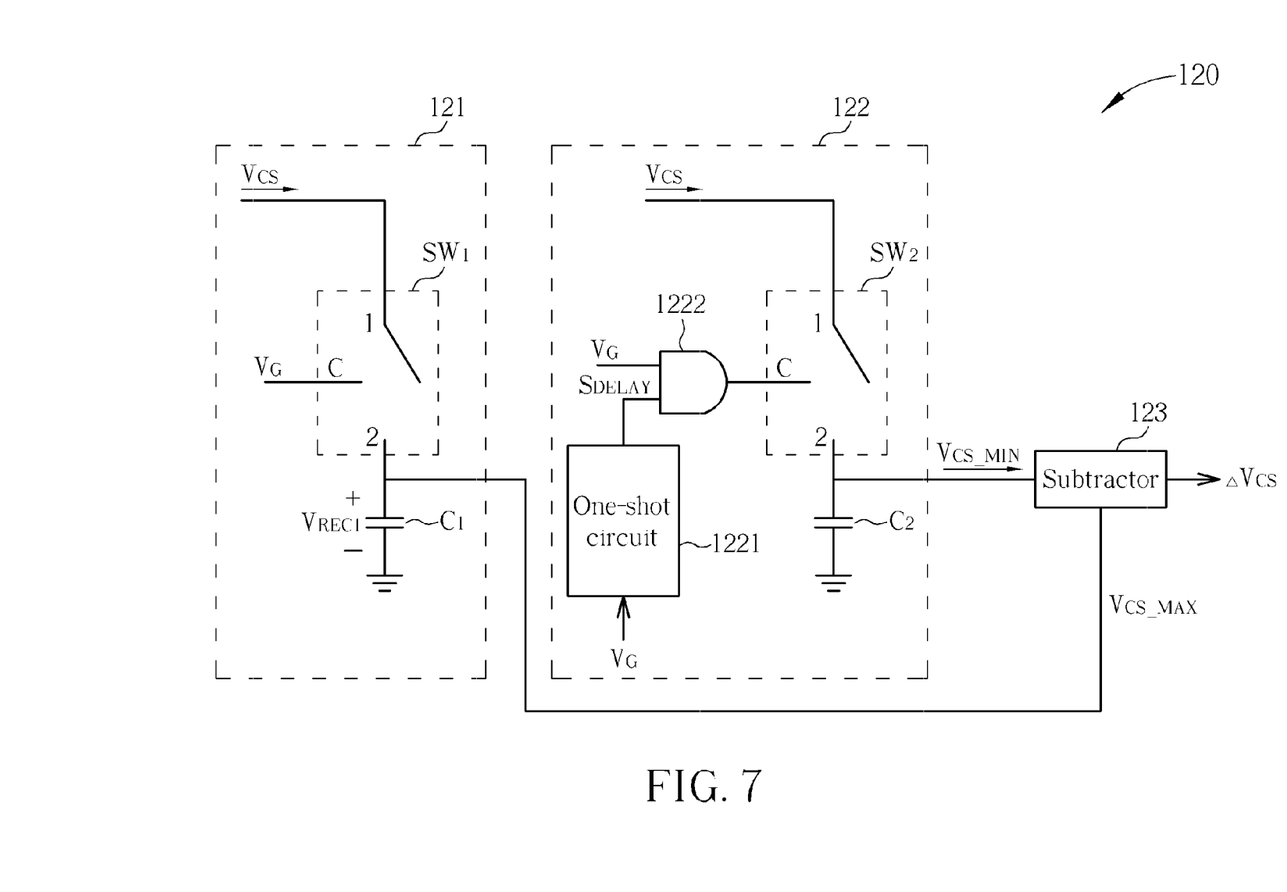
FIG. 7 is a diagram illustrating a voltage-variation detecting circuit according to an embodiment of the present invention.

Please refer to FIG. 7. FIG. 7 is a diagram illustrating the voltage-variation detecting circuit 120 according to an embodiment of the present invention. The voltage-variation detecting circuit 120 includes a maximum-voltage sampling circuit 121, a minimum-voltage sampling circuit 122, and a subtractor 123. The maximum-voltage sampling circuit 121 is utilized for detecting the inductor-current detecting voltage $V_{CS}$ when the power switch $Q_{PW}$ is turned on to record the maximum $V_{CS\_MAX}$ of the inductor-current detecting voltage $V_{CS}$. The structure and the operational principle of the maximum-voltage sampling circuit 121 are well known to those skilled in the art. The maximum-voltage sampling circuit 121 shown in FIG. 7 is merely an example for illustration, and the maximum-voltage sampling circuit 121 of the present invention is not limited to be the circuit shown in FIG. 7. In FIG. 7, the maximum-voltage sampling circuit 121 includes a switch $SW_1$, and a capacitor $C_1$. The capacitor $C_1$ is utilized for recording a recorded voltage $V_{REC1}$. The control end C of the switch $SW_1$ is utilized for receiving a power-switch control signal $V_G$, wherein the power-switch control signal $V_G$ is also utilized for turning the power switch $Q_{PW}$ on or off. When the switch $SW_1$ is turned on, the inductor-current detecting voltage $V_{CS}$ charges the capacitor $C_1$. The recorded voltage $V_{REC1}$ which is recorded by the capacitor $C_1$ until the switch $SW_1$ changes to be turned off again represents the maximum of the inductor-current detecting voltage $V_{CS}$. The structure and the operational principle of the minimum-voltage sampling circuit 122 are also well known to those skilled in the art. The minimum-voltage sampling circuit 122 shown in FIG. 7 is merely an example for illustration, and the minimum-voltage sampling circuit 122 of the present invention is not limited to be the circuit shown in FIG. 7.

In FIG. 7, the minimum-voltage sampling circuit 122 includes a switch $SW_2$, a capacitor $C_2$, a one-shot circuit 1221, and a logic circuit 1222 (such as an AND gate). When the power-switch control signal $V_G$ is logic-high, the one-shot circuit 1221 is triggered to output a delay pulse signal $S_{DELAY}$ of logic-high after a delay period $T_{DELAY}$. In the pulse period of the delay pulse signal $S_{DELAY}$, the logic circuit 1222 outputs a signal of logic-high and then changes to output a logic-low, so that the switch $SW_2$ is turned on for a short period and then changes to be turned-off immediately. The capacitor $C_2$ records the inductor-current detecting voltage $V_{CS}$ when the switch $SW_2$ is turned on. In other words, a delay period $T_{DELAY}$ after the power switch $Q_{PW}$ is turned on, the minimum-voltage sampling circuit 122 records the inductor-current detecting voltage $V_{CS}$ as the minimum $V_{CS\_MIN}$ of the inductor-current detecting voltage $V_{CS}$, wherein the delay period $T_{DELAY}$ is mainly for avoiding the capacitor $C_2$ recording an incorrect voltage because of the ringing phenomenon of the inductor-current detecting voltage $V_{CS}$ at the moment that the power switch $Q_{PW}$ is just turned on. In this way, the voltage-variation detecting circuit 120 can output the voltage variation $\Delta V_{CS}$ of the inductor-current detecting voltage $V_{CS}$ when the power switch $Q_{PW}$ is turned on by means of the subtractor 123 subtracting the minimum $V_{CS\_MIN}$ from the maximum $V_{CS\_MAX}$.

Figure 8:
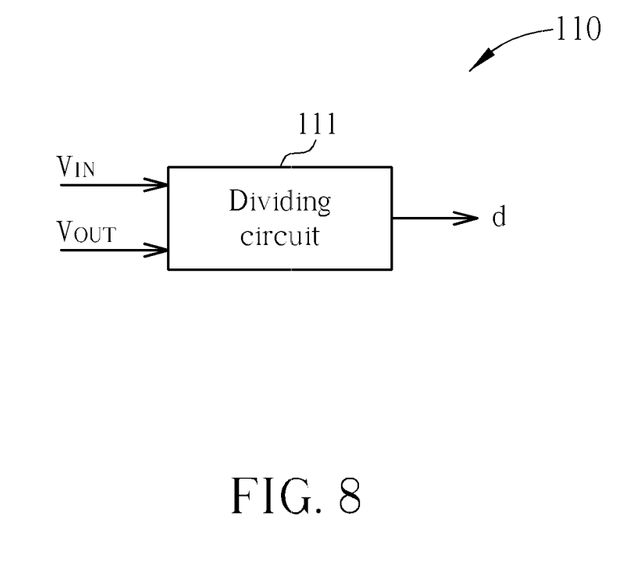
FIG. 8 is a diagram illustrating a duty-cycle detecting circuit according to an embodiment of the present invention.

Please refer to FIG. 8 that is a diagram illustrating the duty-cycle detecting circuit 110 according to an embodiment of the present invention. The duty-cycle detecting circuit 110 shown in FIG. 8 detects the input power $V_{IN}$ and the output voltage $V_{OUT}$ to calculate the duty cycle d of the power switch $Q_{PW}$. The duty-cycle detecting circuit 110 shown in FIG. 8 includes a dividing circuit 111 for calculating the ratio of the input power $V_{IN}$ to the output voltage $V_{OUT}$ to obtain the duty cycle d of the power switch $Q_{PW}$. In addition to the duty-cycle detecting circuit 110 shown in FIG. 8, there are still many methods capable of detecting the duty cycle d of the power switch $Q_{PW}$. For example, when the power switch $Q_{PW}$ operates in the mode that the power switch $Q_{PW}$ has a fixed predetermined PWM cycle $T_{SPRE}$, the duty-cycle detecting circuit 110 can detect the turned on period $T_{ON}$ of the power switch $Q_{PW}$ first, and then calculate the duty cycle d of the power switch $Q_{PW}$ according to the predetermined PWM cycle $T_{SPRE}$ and the turned on period $T_{ON}$ of the power switch $Q_{PW}$. Since the circuits for detecting the duty cycle d of the power switch $Q_{PW}$ in different operational modes are well-known to people skilled in the art, those circuits will be omitted for brevity.

Figure 9:
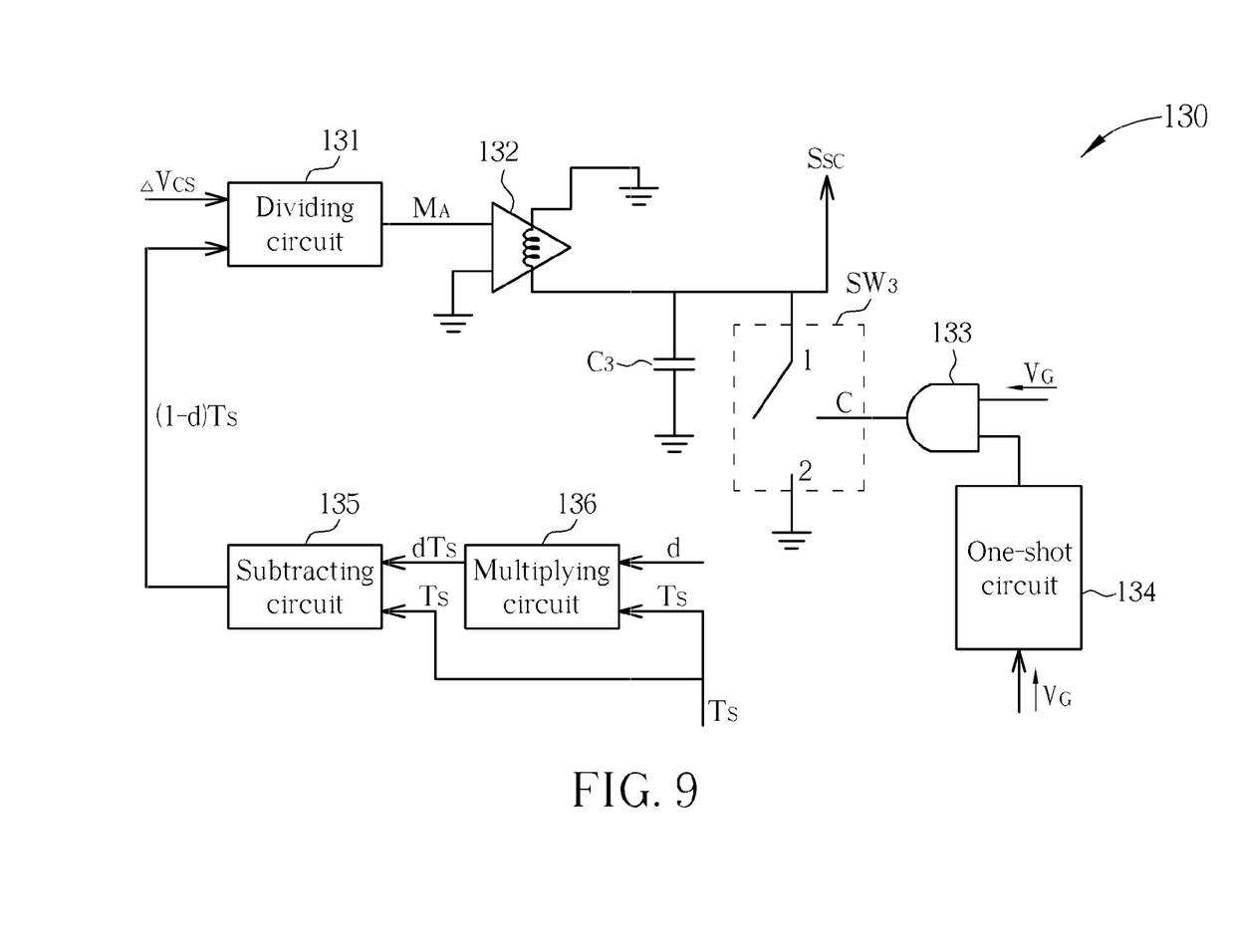
FIG. 9 is a diagram illustrating a slope-compensation integrating circuit according to an embodiment of the present invention.

Please refer to FIG. 9. FIG. 9 is a diagram illustrating the slope-compensation integrating circuit 130 according to an embodiment of the present invention. In FIG. 9, the slope-compensation integrating circuit 130 includes a dividing circuit 131, a voltage-current converting circuit 132, a capacitor $C_3$, a switch $SW_3$, an AND gate 133, a one-shot circuit 134, a subtracting circuit 135, and a multiplying circuit 136. The multiplying circuit 136 multiplies the duty cycle d and the PWM cycle $T_S$ of the power switch $Q_{PW}$ to obtain the switch-on period $(d \times T_S)$ of the power switch $Q_{PW}$. The subtracting circuit 135 is utilized for calculating the switch-off period $[(1-d) \times T_S]$ of the power switch $Q_{PW}$ according to the switch-on period $(d \times T_S)$ and the PWM cycle $T_S$ of the power switch $Q_{PW}$. That is, the slope-compensation integrating circuit 130 can calculate the switch-off period $[(1-d) \times T_S]$ of the power switch $Q_{PW}$ according to the duty cycle d. The dividing circuit 131 is utilized for calculating the compensation slope $M_A$ according to the switch-off period $[(1-d) \times T_S]$ of the power switch $Q_{PW}$ and the voltage variation $\Delta V_{CS}$. The voltage-current converting circuit 132 and the capacitor $C_3$ form an integrating circuit for integrating the compensation slope $M_A$ to generate the slope-compensation signal $S_{SC}$. In addition, the one-shot circuit 134 and the AND gate 133 are utilized for controlling the switch $SW_3$ resetting the slope-compensation signal $S_{SC}$ when the power switch $Q_{PW}$ is turned on, wherein the operational principle is similar to the minimum-voltage sampling circuit 122 shown in FIG. 7.

In conclusion, in the adaptive slope-compensation module provided by the present invention, the voltage variation of the inductor-current detecting voltage when the power switch is turned on is detected by the voltage-variation detecting circuit, and the duty cycle of the power switch is detected by the duty-cycle detecting circuit. In this way, the adaptive slope-compensation module of the present invention calculates the rising slope or the falling slope of the inductor current according to the duty cycle of the power switch and the voltage variation of the inductor-current detecting voltage, and accordingly obtains the compensation slope. Since the rising slope and the falling slope of the inductor current reveals the change of the input power and the output voltage of the switch-mode power supply. Consequently, the adaptive slope-compensation module of the present invention can generate the proper amount of the slope compensation (slope-compensation signal) according to the compensation slope which is obtained according to the rising slope and the falling slope of the inductor current. In this way, even if the operation of the input power or the output voltage of the switch-mode power supply changes, the switch control circuit of the switch-mode power supply still can properly adjust the timing of turning the power switch on or off according to the slope-compensation signal provided by the adaptive slope-compensation module of the present invention, to maintain the response speed of the switch-mode power supply and avoid the switch-mode power supply generating sub-harmonic oscillations.

Those skilled in the art will readily observe that numerous modifications and alterations of the device and method may be made while retaining the teachings of the invention.

What is claimed is:

1. An adaptive slope-compensation method applied to a switch-mode power supply, the switch-mode power supply having a power switch and an inductor coupled to an input power, the power switch controlling the inductor to store energy or release energy to generate an output voltage, the adaptive slope-compensation method comprising:
    detecting an inductor current passing through the inductor, thereby generating an inductor-current detecting voltage;
    detecting a duty cycle of the power switch;
    detecting a maximum and a minimum of the inductor-current detecting voltage and determining a voltage variation of the inductor-current detecting voltage according to the maximum and the minimum of the inductor-current detecting voltage when the power switch is turned on;
    generating a slope-compensation signal according to the voltage variation and the duty cycle; and
    adjusting a timing to turn on or turn off the power switch according to the slope-compensation signal;
    wherein detecting the maximum of the inductor-current detecting voltage comprises:
        continuously comparing the inductor-current detecting voltage with a first recorded voltage when the power switch is turned on;
        setting voltage level of the first recorded voltage to be equal to voltage level of the inductor-current detecting voltage when the inductor-current detecting voltage is higher than the first recorded voltage; and
        outputting the maximum of the inductor-current detecting voltage according to the first recorded voltage.

2. The adaptive slope-compensation method of claim 1, wherein detecting the duty cycle of the power switch comprises:
    detecting the input power and the output voltage to detect the duty cycle of the power switch.

3. The adaptive slope-compensation method of claim 1, wherein detecting the duty cycle of the power switch comprises:
    detecting a turned-on period of the power switch; and
    calculating the duty cycle of the power switch according to a predetermined pulse-width-modulation (PWM) cycle and the turned-on period.

4. The adaptive slope-compensation method of claim 1, wherein detecting the minimum of the inductor-current detecting voltage comprises:
   delaying for a period after the power switch is turned on, then detecting and recording the inductor-current detecting voltage as the minimum.

5. The adaptive slope-compensation method of claim 1, wherein generating the slope-compensation signal according to the voltage variation and the duty cycle comprises:
   calculating a turned off period of the power switch according to the duty cycle; and
   generating the slope-compensation signal according to the voltage variation and the turned off period of the power switch by means of integration.

6. The adaptive slope-compensation method of claim 1, wherein adjusting the timing of turning the power switch on or off according to the slope-compensation signal comprises:
   determining a limiting value of the inductor current according to the slope-compensation signal;
   comparing the inductor current with the limiting value, and generating a comparing signal; and
   adjusting the timing to turn on or turn off the power switch according to the comparing signal.

7. The adaptive slope-compensation method of claim 1, wherein the switch-mode power supply operates in a continuous current mode (CCM).

8. The adaptive slope-compensation method of claim 1, wherein the switch-mode power supply is a buck power supply, a boost power supply, or a buck-boost power supply.

9. An adaptive slope-compensation module, applied in a switch-mode power supply, the switch-mode power supply having a switch control circuit, a power switch, an inductor coupled to an input power, and an inductor-current detecting circuit for detecting an inductor current passing through the inductor, thereby generating an inductor-current detecting voltage, the switch control circuit turning the power switch on or off to control the inductor to store energy or release energy to generate an output voltage, the adaptive slope-compensation module comprising:
   a duty-cycle detecting circuit for detecting a duty cycle of the power switch;
   a voltage-variation detecting circuit for detecting a voltage variation of the inductor-current detecting voltage when the power switch is turned on; and
   a slope-compensation integrating circuit for calculating a compensation slope according to the voltage variation and the duty cycle, then integrating the compensation slope to generate a slope-compensation signal;
   wherein the switch control circuit determines a limiting value of the inductor current according to the slope-compensation signal, and compares the inductor current with the limiting value, thereby generating a comparing signal; and the switch control circuit adjusts a timing to turn on or turn off the power switch according to the comparing signal.

10. The adaptive slope-compensation module of claim 9, wherein the voltage-variation detecting circuit comprises a maximum-voltage sampling circuit for detecting the inductor-current detecting voltage when the power switch is turned on, thereby recording a maximum of the inductor-current detecting voltage.

11. The adaptive slope-compensation module of claim 10, wherein the voltage-variation detecting circuit further comprises a minimum-voltage sampling circuit for detecting the inductor-current detecting voltage when the power switch is turned on, thereby recording a minimum of the inductor-current detecting voltage.

12. The adaptive slope-compensation module of claim 9, wherein the duty-cycle detecting circuit detects the input power and the output voltage to calculate the duty cycle of the power switch.

13. The adaptive slope-compensation module of claim 9, wherein the duty-cycle detecting circuit calculates the duty cycle of the power switch according to a predetermined pulse-width-modulation (PWM) cycle of the power switch.

14. The adaptive slope-compensation module of claim 9, wherein the slope-compensation integrating circuit calculates a turned-off period of the power switch according to the duty cycle, and then generates the slope-compensation signal according to the voltage variation of the inductor-current detecting voltage and the turned-off period of the power switch by means of integration.

15. The adaptive slope-compensation module of claim 9, wherein the switch-mode power supply operates in a continuous current mode (CCM).

16. The adaptive slope-compensation module of claim 9, wherein the switch-mode power supply is a buck power supply, a boost power supply, or a buck-boost power supply.

17. An adaptive slope-compensation method applied to a switch-mode power supply, the switch-mode power supply having a power switch and an inductor coupled to an input power, the power switch controlling the inductor to store energy or release energy to generate an output voltage, the adaptive slope-compensation method comprising:
   detecting an inductor current passing through the inductor, thereby generating an inductor-current detecting voltage;
   detecting a duty cycle of the power switch;
   detecting a voltage variation of the inductor-current detecting voltage when the power switch is turned on;
   generating a slope-compensation signal according to the voltage variation and the duty cycle;
   determining a limiting value of the inductor current according to the slope-compensation signal;
   comparing the inductor current with the limiting value, and generating a comparing signal; and
   adjusting a timing to turn on or turn off the power switch according to the comparing signal.

* * * * *